United States Patent [19]

Borlinghaus et al.

[11] Patent Number: 5,037,132
[45] Date of Patent: Aug. 6, 1991

[54] HYDRAULIC SEAT BELT LOAD ANCHOR

[75] Inventors: Hans J. Borlinghaus, Mt. Clemens; Paul D. Roper, Rochester, both of Mich.; Manfred A. Plechaty, Markt Schwaben, Fed. Rep. of Germany

[73] Assignee: General Motors Corporation, Detroit, Mich.

[21] Appl. No.: 521,852

[22] Filed: Apr. 10, 1990

[51] Int. Cl.$^5$ .............................................. B60R 22/22
[52] U.S. Cl. .................................. 280/801; 297/470; 297/473; 188/280; 188/282
[58] Field of Search ............... 280/801, 806, 805, 808; 188/280, 282; 297/470, 473, 478, 480, 482

[56] References Cited

U.S. PATENT DOCUMENTS

| | | | |
|---|---|---|---|
| 2,649,145 | 8/1953 | McCarthy | 188/311 |
| 2,680,476 | 6/1954 | Saffell | 188/317 |
| 3,371,960 | 3/1968 | Bayer et al. | 297/470 |
| 3,484,134 | 12/1969 | Townsend | 188/317 |

FOREIGN PATENT DOCUMENTS

| | | | |
|---|---|---|---|
| 3734152 | 4/1989 | Fed. Rep. of Germany | 280/806 |
| 62-18348 | 1/1987 | Japan | 297/473 |

Primary Examiner—Charles A. Marmor
Assistant Examiner—Tamara L. Finlay
Attorney, Agent, or Firm—Charles F. Leahy

[57] ABSTRACT

A vehicle seat is mounted on the vehicle body by a seat adjuster which enables movement of the seat relative to the vehicle body to a position chosen by the occupant. A seat belt is anchored on the seat so that the seat belt moves with the seat to the adjusted position. An extensible cylinder extends from the vehicle floor to the seat belt anchor on the seat and extends and retract as necessary to accommodate the adjusting movement of the seat. The extensible cylinder includes a piston movable within a fluid filled chamber and having a flow rate responsive valve associated therewith which permits low flow rate fluid flow through the piston during adjusting movement of the seat so that the cylinder extends and retracts to follow the seat. The imposition of an occupant restraint load on the seat belt induces motion of the piston and high rate flow of fluid through the valve causing the valve to block fluid flow through the piston so that the piston is locked within the cylinder and the occupant restraint load is transmitted from the seat belt to the floor.

1 Claim, 2 Drawing Sheets

HYDRAULIC SEAT BELT LOAD ANCHOR

FIELD OF THE INVENTION

The invention relates to a seat belt mounted on a vehicle seat and more particularly provides a hydraulic cylinder transferring the occupant restraint load to the vehicle floor.

BACKGROUND OF THE INVENTION

It is known to provide a motor vehicle seat mounted on the floor by a seat adjusting mechanism by which the seat can be adjusted fore and aft and up and down to adjust the occupant seating position.

It is also known to provide a occupant restraint belt for restraining an occupant in the vehicle seat. It has been recognized in the prior art as desirable to mount the seat belt directly on the seat so that the belt travels with the seat during adjusting movement of the seat. The prior art has also provided load transfer mechanisms acting between the seat belt anchorage on the seat and the vehicle floor to transmit the occupant restraint load directly to the floor rather than transmitting the occupant restraint load through the seat adjusting mechanism.

The present invention provides a new and improved seat belt load transfer mechanism comprised of a hydraulic fluid-filled extensible cylinder acting between the floor and the seat belt anchorage to transmit the occupant restraining load.

SUMMARY OF THE INVENTION

According to the invention a vehicle seat is mounted on the vehicle body by a seat adjuster which enables movement of the seat relative to the vehicle body to a position chosen by the occupant. A seat belt is anchored on the seat so that the seat belt moves with the seat to the adjusted position. An extensible cylinder extends from the vehicle floor to the seat belt anchor on the seat and extends and retract as necessary to accommodate the adjusting movement of the seat. The extensible cylinder includes a piston movable within a fluid filled chamber and having a flow rate responsive valve associated therewith which permits low flow rate fluid flow through the piston during adjusting movement of the seat so that the cylinder extends and retracts to follow the seat. The imposition of an occupant restraint load on the seat belt induces motion of the piston and high rate flow of fluid through the valve causing the valve to block fluid flow through the piston so that the piston is locked within the cylinder and the occupant restraint load is transmitted from the seat belt to the floor.

Accordingly, the object, feature and advantage of the invention resides in the provision of an extensible cylinder acting between a seat belt and a vehicle floor to transmit occupant restraint loads from the seat to the vehicle floor.

Another feature object and advantage of the invention resides in the provision of a fluid filled extensible cylinder acting between a seat mounted seat belt and the vehicle floor and having a flow rate responsive valve associated with a piston movable in the cylinder to permit extension of the cylinder during low flow rate fluid flow resulting from adjusting movement of the vehicle seat and to block fluid flow through the piston to prevent extension of the cylinder upon high rate fluid flow induced by imposition of an occupant restraining load on the piston.

These and other features, objects and advantages of the invention will become apparent upon further consideration of the description of the preferred embodiment and reference to the appended drawings in which.

DESCRIPTION OF THE PREFERRED EMBODIMENT

Figure 1:
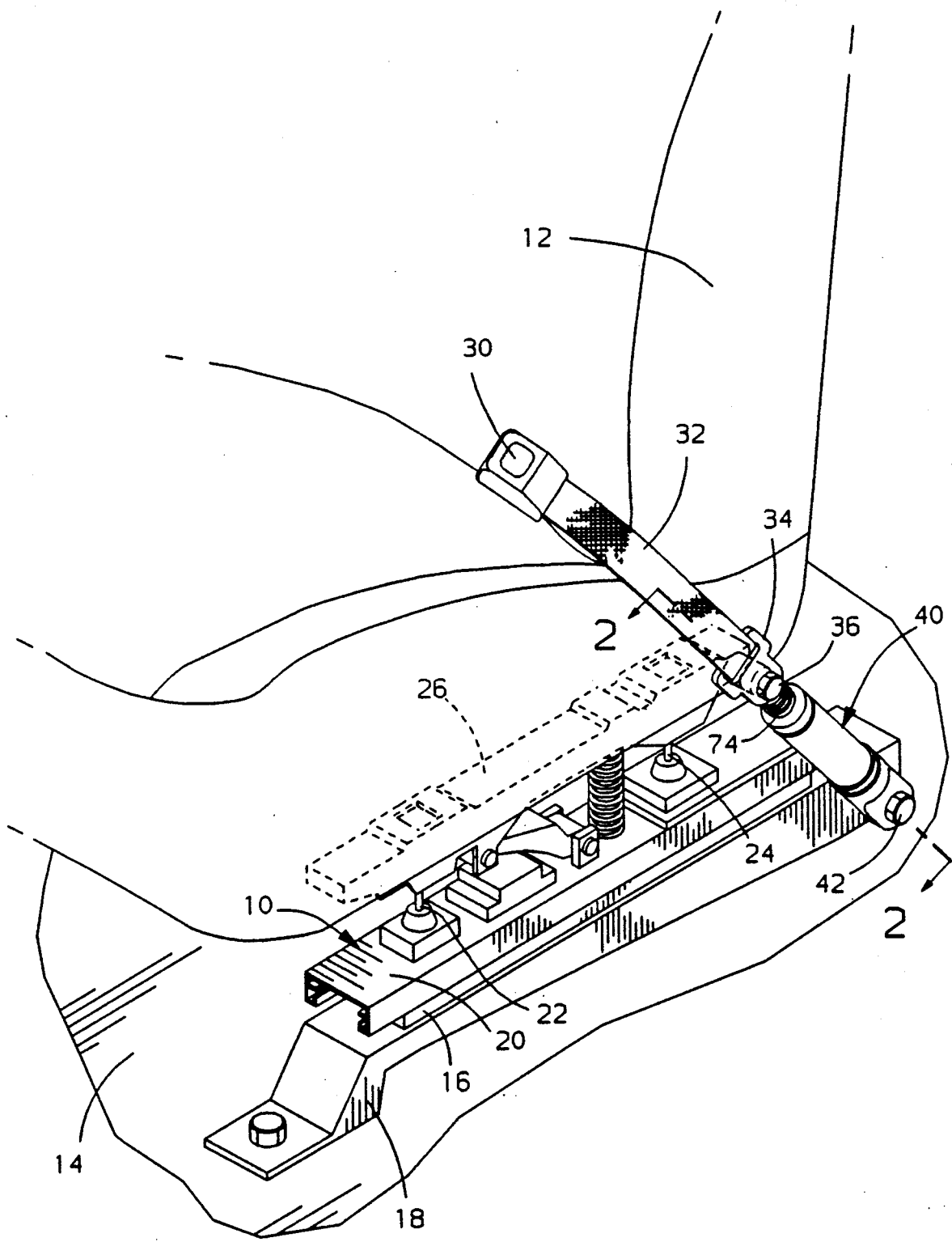
FIG. 1 is a perspective view of a vehicle seat mounted on the floor by seat adjusting mechanism and having a seat belt carried by the seat and anchored to the floor by the extensible cylinder of this invention.

Referring to FIG. 1 it is seen that a seat adjuster mechanism generally indicated at 10 mounts a vehicle seat 12 on the vehicle floor 14. The seat adjuster 10 includes a lower track 16 mounted on the floor 14 by a floor bracket 18. An upper track 20 slideably engages the lower track 16 and is movable fore and aft relative the lower track 16 by a motor, not shown, to adjust the fore and aft position of the seat 12. The seat adjuster mechanism 10 also includes a front jack screw 22 and a rear jack screw 24 which respectively act between the upper track 20 and the forward and rearward ends of a seat frame attachment member 26 which mounts the seat to adjust the seat vertically.

The vehicle body also has a seat belt system including a buckle 30 connected to a belt 32 which is mounted on the seat frame attachment member 26 via anchor loop 34 and a bolt 36. The seat belt buckle 30 moves fore and aft and up and down with the seat to maintain a constant position relative the occupant irrespective of adjusting movement of the seat.

An extensible cylinder assembly, generally indicated at 40, has one end attached to the seat belt anchor loop 34 by the bolt 36 and the other end attached to the vehicle floor by bolt 42 at the rear leg of mounting bracket 18.

Figure 2:
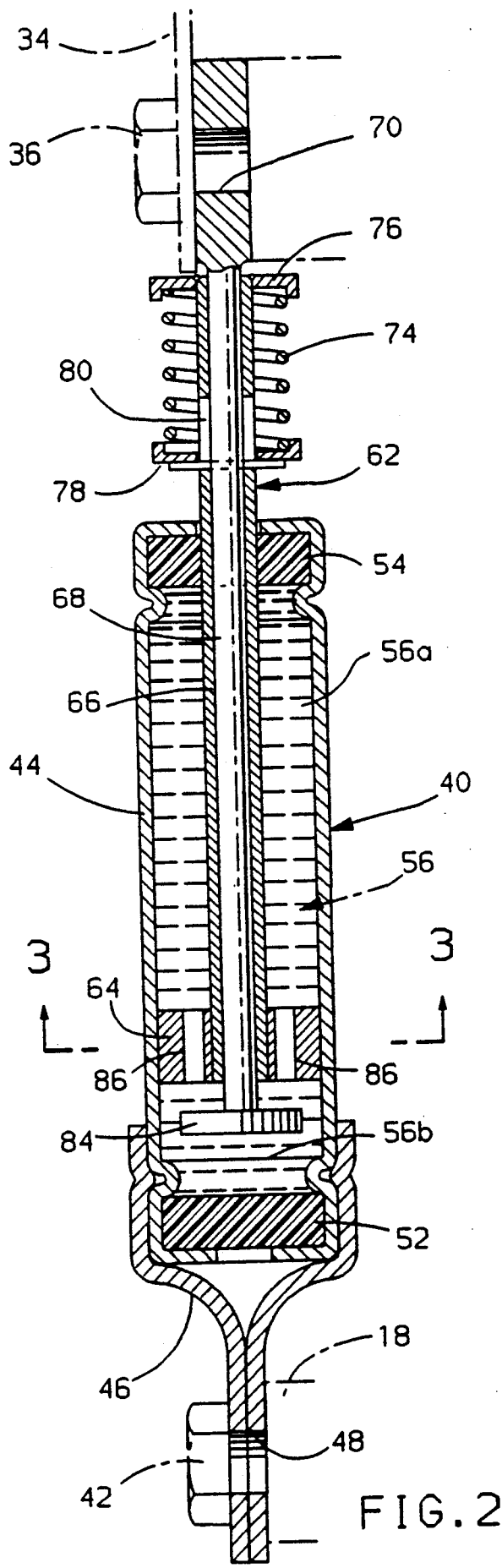
FIG. 2 is a section view taken in the direction of arrows 2—2 of FIG. 1.
Figure 3:
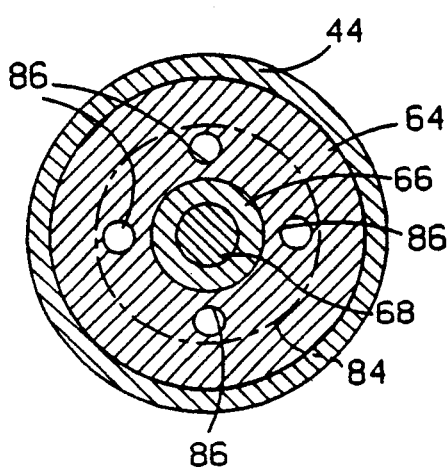
FIG. 3 is a section view taken in the direction of arrows 3—3 of FIG. 2.

Referring to FIG. 2 it is seen that the extensible cylinder assembly 40 is comprised of a cylinder 44 having its lower end swaged to a mounting bracket 46 having aperture 48 for receiving the bolt 42. A seal disc 52 is mounted at the lower end of the cylinder 44 and a seal disc 54 is mounted at the upper end of the cylinder 44 to define therewith a fluid chamber 56. A piston assembly, generally indicated at 62 is slideably mounted within the cylinder 44. The piston assembly 62 includes a piston wall 64 sealingly slideable within the cylinder 44 and having an annular rod 66 which extends through the seal disc 54. The piston wall 64 divides the chamber 56 into upper chamber 56a and lower chamber 56b. The piston assembly 62 also includes a valve rod 68 which is sealingly slideable within the annular rod 66 and has an aperture 70 at the outer end which receives the bolt 36 attaching the seat belt anchor bracket 34. A coil compression spring 74 has one end seated on a flange 76 carried by annular rod 66 and another end seated on a washer 78 carried by rod 68 which is slideably guided within a slot 80 of the annular rod 66. The coil compression spring 74 acts to urge the annular piston rod 66 and the valve rod 68 to their relative positions as shown in FIG. 2 in which a valve member 84 carried by the lower end of valve rod 68 is spaced axially away from the piston wall 64. As best seen in FIGS. 2 and 3, the piston wall 64 has a plurality of valve orifices 86 which communicate hydraulic fluid through the piston wall 64.

In operation, it will be appreciated that fore and aft adjusting movement of the seat by the seat adjuster assembly 10 is accommodated by extension and retraction of the extensible cylinder assembly 40. In particular, forward adjusting movement of the seat will move the valve rod 68 forwardly and the coil compression spring 74 in turn transmits the motion to the annular piston rod 66 so that the annular rod 66 and the piston wall 64 follow the motion of the valve rod 68 as permitted by sliding of the piston wall 64 within the cylinder 44 and the flow of hydraulic fluid from the upper chamber 56a to the lower chamber 56b.

However, in the event that an occupant restraint load is imposed upon the buckle 30 and belt 32, this load is transmitted to the valve rod 68 and induces a forward extending motion of the valve rod 68. The orifices 86 are sized to provide a substantial flow obstruction to the rapid passage of hydraulic fluid from the upper chamber 56a to the lower chamber 56b so that the piston wall 64 necessarily lags behind the motion of the piston rod 68 and valve seal 84 as permitted by compression of the coil compression spring 74. Thus the valve seal 84 closes off the orifices 86 which then prevents further passage of hydraulic fluid from the upper chamber 56a to the lower chamber 56b so that the piston assembly 62 is locked against further movement in the extending direction to transmit the occupant restraint load imposed thereon to the vehicle floor through the mounting bracket 46.

The release of the occupant restraint load from the belt allows the coil compression spring 74 to extend and disengage the valve seal 84 from the piston wall 64 to again open the orifices 86 and permit normal movement or the piston assembly 62 within the cylinder 44.

Thus it is seen that the piston assembly acts as a flow rate responsive valve to normally permit a low rate of fluid flow through the piston during slow speed adjusting movement of the seat, but blocks fluid flow through the piston in response to a higher rate of fluid flow through the piston when an occupant restraint load is imposed thereon.

Thus, the invention provides a new and improved hydraulic load transfer mechanism for transmitting an occupant restraint load from the vehicle seat to the vehicle floor.

The embodiments of the invention in which an exclusive property or privilege is claimed are defined as follows:

1. In a motor vehicle having a seat mounted on the floor by a seat adjuster and a seat belt for restraining an occupant in the seat, the improvement comprising:
    means mounting the seat belt on the seat for movement with the seat upon adjusting movement of the seat,
    and an extensible cylinder extending between the means mounting the seat belt and the vehicle floor for transmitting loads imposed on the seat belt to the vehicle floor, said extensible cylinder including a fluid filled cylinder mounted on the floor, a piston movable within the fluid filled cylinder and having at lest one orifice permitting flow of fluid therethrough during movement of the piston within the cylinder a valve rod attached to the means mounting the seat belt on the seat and extending through the fluid filled cylinder and having a valve seal mounted thereon, and spring means acting between the piston and the valve rod and adapted to establish the valve seal in a normal open condition relative the orifice in the piston to communicate fluid through the orifice and permit extension of the extensible cylinder during normal slow rate movement of the piston within the cylinder during adjusting movement of the seat, and said spring means being overcome in response to the initiation of higher rate movement of valve rod and valve seal within the cylinder upon imposition of an occupant restraint load upon the valve rod by the seat belt to cause the valve seal to block the orifice to prevent further fluid flow through the piston so that the piston prevents movement of the valve seal and valve rod to lock the extensible cylinder against extension to transmit the occupant restraining load to the vehicle floor.

* * * * *